United States Patent
Hiemstra

(12) 
(10) Patent No.: US 6,419,315 B1
(45) Date of Patent: Jul. 16, 2002

(54) MOUNTING DEVICE OF AN OCCUPANT DETECTION SYSTEM

(75) Inventor: Bruce A. Hiemstra, Ann Arbor, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 130 days.

(21) Appl. No.: 09/585,156

(22) Filed: Jun. 1, 2000

(51) Int. Cl.[7] ................................................. B60N 2/42
(52) U.S. Cl. .............................. 297/216.1; 297/216.18; 297/217.3; 296/68.1; 296/65.03
(58) Field of Search .......................... 297/216.1, 216.16, 297/216.18, 217.3; 296/65.03, 68.1

(56) References Cited

U.S. PATENT DOCUMENTS

| | | | | |
|---|---|---|---|---|
| 4,832,409 A | * | 5/1989 | Borlinghaus et al. | 297/216.1 |
| 4,881,781 A | * | 11/1989 | Borlinghaus et al. | 297/216.1 |
| 5,803,491 A | * | 9/1998 | Barnes et al. | 296/68.1 |
| 6,039,344 A | * | 3/2000 | Mehney et al. | 297/216.18 |
| 6,257,641 B1 | * | 7/2001 | Fritz et al. | 297/217.3 |
| 6,279,981 B1 | * | 8/2001 | Mesnage | 296/65.03 |

* cited by examiner

*Primary Examiner*—Anthony D. Barfield
(74) *Attorney, Agent, or Firm*—Foley & Lardner

(57) ABSTRACT

An occupant detection system for a vehicle including a seat assembly and a mounting device. The mounting device includes a first member connected to the seat assembly, a second member connectable to the vehicle and connected to the first member at a first point, a floating joint located at a second point engageable with the seat assembly and with the vehicle, and a load sensor located on one of the first member and a second member between the first point and the second point. A compressing force tending to compress the seat assembly toward the vehicle travels through the load sensor, while a pulling force tending to pull the seat assembly from the vehicle travels through the floating joint.

21 Claims, 2 Drawing Sheets

MOUNTING DEVICE OF AN OCCUPANT DETECTION SYSTEM

TECHNICAL FIELD OF THE INVENTION

This invention generally relates to occupant detection systems for a vehicle. More specifically, this invention relates to a mounting device of an occupant detection system for a vehicle with a seat assembly.

BACKGROUND

With the increased use of airbag technologies, the need has arisen to provide an occupant detection system for sensing whether or not an occupant is present within a seat assembly and, in some situations, to determine the approximate size of the occupant. The apparatus of the Mehney et al. reference (U.S. Pat. No. 6,039,344), to some extent, satisfies these needs. The apparatus includes a vehicle seat frame and a weight sensor apparatus with a mounting member. When using the apparatus of the Mehney et al. reference, a compressing force tending to compress the vehicle seat frame toward the vehicle travels through the weight sensor apparatus. A pulling force tending to pull the vehicle seat frame from the vehicle, however, also travels through the weight sensor apparatus. Because of this arrangement, the mounting member of the apparatus must be designed with extra material, and extra weight, to accommodate both the compressing forces and the pulling forces.

SUMMARY OF THE INVENTION

Accordingly, this invention provides for an occupant detection system for a vehicle that overcomes the problems and disadvantages of the conventional techniques in the art.

Briefly the invention includes an occupant detection system for a vehicle including a seat assembly and a mounting device. The mounting device includes a first member connected to the seat assembly, a second member connectable to the vehicle and connected to the first member at a first point, a floating joint located at a second point engageable with the seat assembly and with the vehicle, and a load sensor located on one of the first member and a second member between the first point and the second point. A compressing force tending to compress the seat assembly toward the vehicle travels through the load sensor, while a pulling force tending to pull the seat assembly from the vehicle travels through the floating joint.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
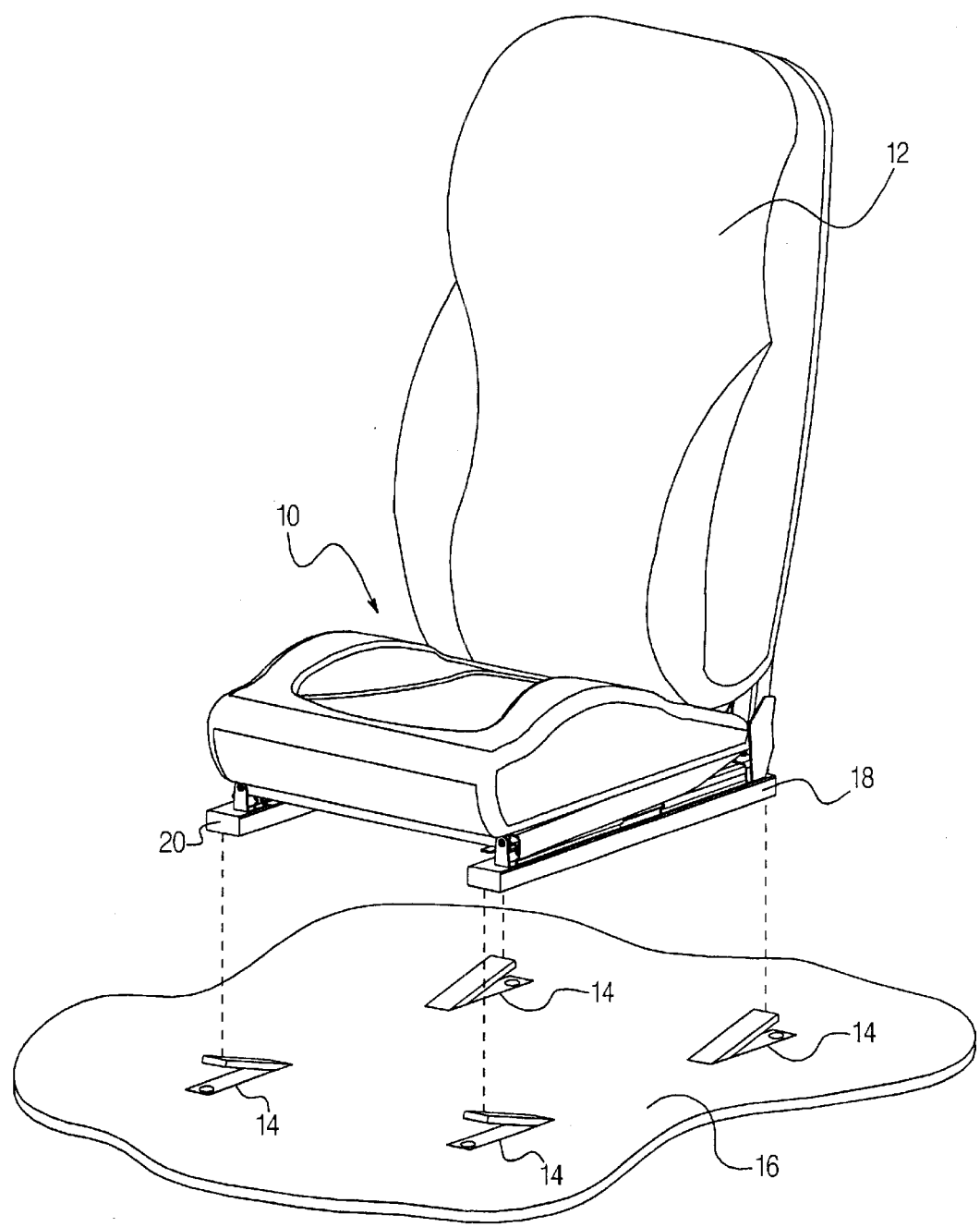
FIG. 1 is a perspective view of the occupant detection system of the preferred embodiment of the invention.

As shown in FIG. 1, the occupant detection system 10 of the preferred embodiment of the invention includes a seat assembly 12 and a mounting device 14. The occupant detection system 10 preferably includes four mounting devices 14 located at each corner of the seat assembly 12, but may alternatively include less than or more than four mounting devices 14 and may alternatively include mounting devices 14 located in other locations. Although the occupant detection system 10 has been specifically designed for a vehicle 16, it may also be used in other environments, such as an office. In the preferred embodiment, the seat assembly 12 includes a first track 18 and a second track 20, which function to allow fore-and-aft adjustment of the seat assembly 12 relative to the vehicle 16. The first track 18 and the second track 20, which are known and used in the art of seat assemblies, are preferably made from conventional materials and with conventional methods, but may alternatively be made from other suitable materials and with other suitable methods. In an alternative embodiment, the occupant detection system 10 may omit the first track 18 and the second track 20.

Figure 2:
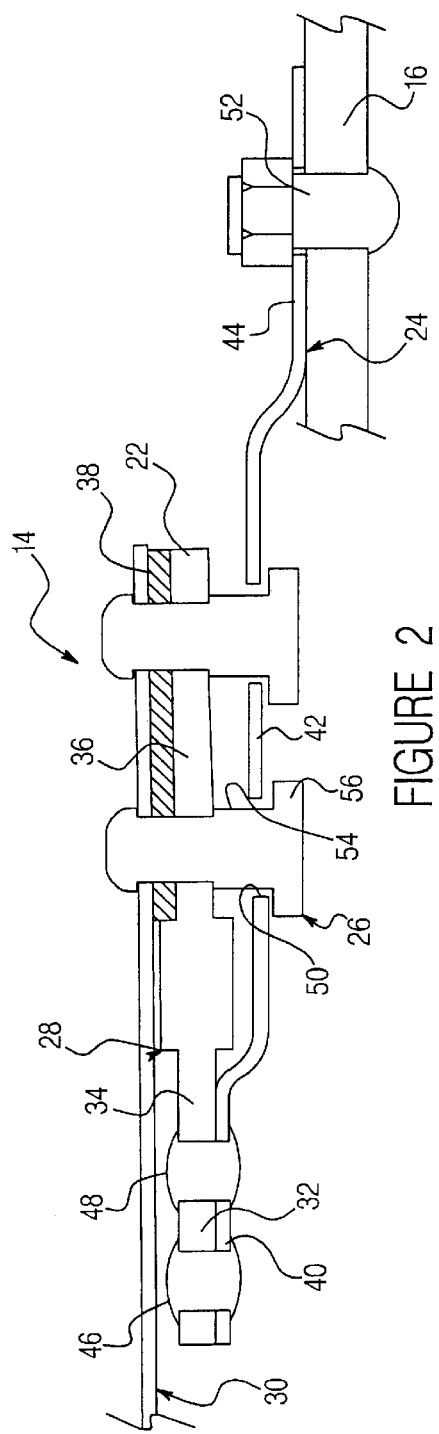
FIG. 2 is a cross-sectional view of the mounting device of the preferred embodiment of the invention, shown with a compressing force.

As shown in FIG. 2, the mounting device 14 of the preferred embodiment of the invention includes a first member 22, a second member 24, a floating joint 26, and a load sensor 28. The mounting device 14 preferably includes a second floating device, similar to the floating, device, to increase the durability of the mounting device 14. but may alternatively include only one floating device or may alternatively include more than two floating devices. The mounting device 14 functions to connect a structural member 30 of the seat assembly 12 to the vehicle 16. When using a seat assembly 12 with the first track and the second track. the structural member 30 is preferably a portion of the first track and the second track. When not using the seat assembly 12 with the first track and the second track, the structural member 30 is preferably a portion of the seat assembly 12.

The first member 22 of the mounting device 14 preferably includes a first section 32, a middle section 34, and a second section 36. The second section 36 is preferably connected to the structural member 30 of the seat assembly 12 by the floating joint 26, but may alternatively be connected to the structural member 30 of the seat assembly 12 with other suitable devices. The connection between the first member 22 and the structural member 30 is preferably secure and. to this end, the occupant detection system 10 preferably includes a washer 38 located between the second section 36 of the first member 22 and the structural member 30 of the seat assembly 12, but may alternatively include other suitable devices. The first member 22 is preferably made from a stiff material, such as steel, and from conventional methods, but may alternatively be made from other suitable materials and with other suitable methods.

The second member 24 of the mounting device 14 preferably includes a first portion 40, a middle portion 42, and a second portion 44. The first portion 40 of the second member 24 is preferably connected to the first section 32 of the first member 22 by first rivet 46 and a second rivet 48, but may alternatively be connected to the first section 32 of the first member 22 by other suitable devices. The connection between the first portion 40 of the second member 24 and the first section 32 of the first member 22 (later referenced as "a first point") is preferably secure. The middle portion 42 of the second member 24 preferably defines a clearance 50 about the floating joint 26. The clearance 50 (later referenced as "a second point") is isolated from the floating joint 26 during some situations and is engaged with the floating joint 26 during other situations, as later explained. The second section 36 of the second member 24 is preferably connected to the vehicle 16 by a threaded fastener 52, but may alternatively be connected to the vehicle 16 with other suitable devices. The second member 24 is preferably made from a stiff material, such as steel, and with conventional methods. but may alternatively be made from other suitable materials and with other suitable methods.

The load sensor 28 functions to sense a compressing force tending to compress the seat assembly 12 towards the vehicle 16. The load sensor 28 may also function to send a signal based on the compressing force to a receiving device, such as a microprocessor in an airbag system. The load sensor 28 is preferably located on the middle section 34 of the first member 22 between the connection of the first member 22 and the second member 24 ("the first point") and the floating joint 26 ("the second point"). The load sensor 28 is preferably a "deflecting beam" type load sensor 28, but may alternatively be another suitable type of load sensors. The load sensor 28, which is known and used in the art of occupant detection systems, is made from conventional materials and with conventional methods, but may alternatively be made from other suitable materials and with other suitable methods.

Figure 3:
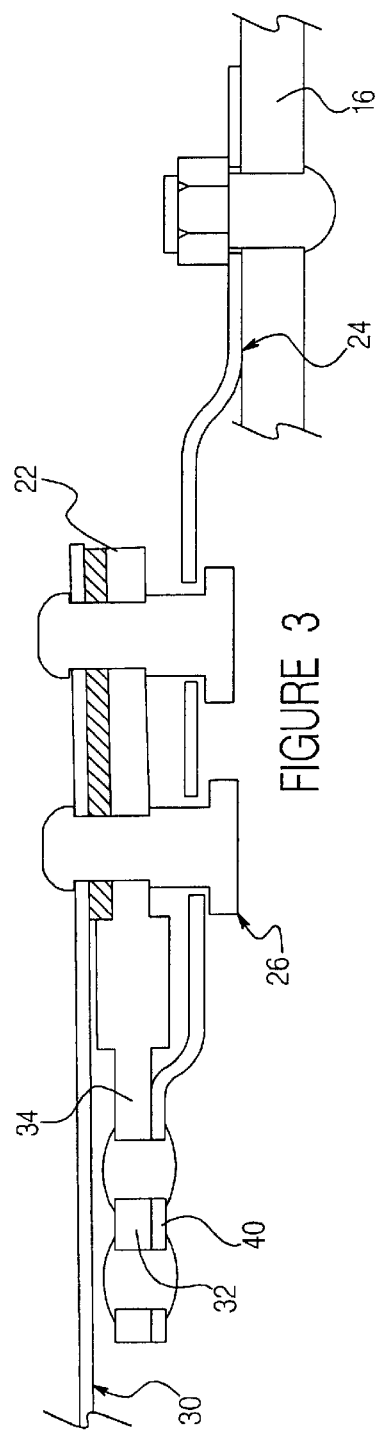
FIG. 3 is a cross-sectional view of the mounting device of FIG. 2, shown with a pulling force.

The floating joint 26 preferably include a smooth shaft 54 and an enlarged head 56. The smooth shaft 54 is preferably designed to fit loosely within the clearance 50 of the second member 24. The enlarged head 56, on the other head, is preferably designed to engage the second member 24. In this matter, the compressing force tending to compress the seat assembly 12 toward the vehicle 16 travels through the structural member 30, the floating joint 26, the first member 22, the load sensor 28, the second member 24, and the vehicle 16. In other words, a compressive force, such as the weight of an occupant in the seat assembly 12, may be sensed by the load sensor 28. As shown in FIG. 3, a pulling force tending to pull the seat assembly 12 from the vehicle 16 travels through the vehicle 16, the second member 24, the floating joint 26, and the structural member 30. In this case, a pulling force, such as the force of an object belted to the seat assembly 12 in a sudden deceleration situation, travels through the floating joint 26. Because the travel path of the pulling force does not include the first portion 40 of the second member 24 and the first section 32 and the middle section 34 of the first member 22, the first member 22 and the second member 24 may be designed with less material and with less weight. The floating joint 26 is preferably is made from a stiff material, such as steel, and with conventional methods, but may alternatively be made with other suitable materials and with other suitable methods.

The preferred method for providing the occupant detection system 10 in the vehicle 16 includes: providing the seat assembly 12; providing the mounting devices 14 including the first member 22, the second member 24, the floating joint 26, and the load sensor 28; connecting the first member 22 to the seat assembly 12; connecting the second member 24 to the vehicle 16 and to the first member 22 at the first point; locating the floating joint 26 at the second point engageable with the seat assembly 12 and with the vehicle 16; and locating the load sensor 28 on one of the first member 22 and the second member 24 between the first point and the second point such that the compressing force tending to compress the seat assembly 12 toward the vehicle 16 travels through the load sensor 28, while the pulling force tending to pull the seat assembly 12 from the vehicle 16 travels through the floating joint 26.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. An occupant detection system for a vehicle, comprising:
   a seat assembly; and
   a mounting device including a first member connected to said seat assembly, a second member connectable to the vehicle and connected to said first member at a first point, a floating joint located at a second point engageable with said seat assembly and with the vehicle, and a load sensor located on one of said first member and said second member between the first point and the second point;
   such that a compressing force tending to compress said seat assembly toward the vehicle travels through said load sensor, while a pulling force tending to pull said seat assembly from the vehicle travels through said floating joint.

2. The occupant detection system of claim 1 wherein said seat assembly includes a track, and said first member is connected to said track.

3. The occupant detection system of claim 1 wherein said floating joint is connected to said first member.

4. The occupant detection system of claim 3 wherein said floating joint is connected to said seat assembly.

5. The occupant detection system of claim 1 wherein said floating joint is engageable with said second member.

6. The occupant detection system of claim 5 wherein said second member defines a clearance about said floating joint, such that during the compressive force said second member is isolated from said floating joint.

7. The occupant detection system of claim 6 wherein said floating joint includes an enlarged head, such that during the pulling force said enlarged head of said floating joint is engaged with said second member.

8. A mounting device of an occupant detection system for a vehicle with a seat assembly, said mounting device comprising:
   a first member connectable to the seat assembly;
   a second member connectable to the vehicle and connected to said first member at a first point;
   a floating joint located at a second point engageable with the seat assembly and with the vehicle; and
   a load sensor located on one of said first member and said second member between the first point and the second point;
   such that a compressing force tending to compress the seat assembly toward the vehicle travels through said load sensor, while a pulling force tending to pull the seat assembly from the vehicle travels through said floating joint.

9. The mounting device of claim 8 wherein said first member is connectable to a track of the seat assembly.

10. The mounting device of claim 8 wherein said floating joint is connected to said first member.

11. The mounting device of claim 10 wherein said floating joint is connectable to the seat assembly.

12. The mounting device of claim 8 wherein said floating joint is engageable with said second member.

13. The mounting device of claim 12 wherein said second member defines a clearance about said floating joint, such that during the compressive force said second member is isolated from said floating joint.

14. The mounting device of claim 13 wherein said floating joint includes an enlarged head, such that during the pulling force said enlarged head of said floating joint is engaged with said second member.

15. A method for providing an occupant detection system in a vehicle, comprising:

providing a seat assembly;

providing a mounting device including a first member, a second member, a floating joint, and a load sensor;

connecting the first member to the seat assembly;

connecting the second member to the vehicle and to the first member at a first point;

locating a floating joint at a second point engageable with the seat assembly and with the vehicle; and locating a load sensor on one of the first member and the second member between the first point and the second point such that a compressing force tending to compress the seat assembly toward the vehicle travels through the load sensor, while a pulling force tending to pull the seat assembly from the vehicle travels through the floating joint.

16. The method of claim 15 wherein said providing a seat assembly includes providing a seat assembly with a track; and wherein said connecting the first member includes connecting the first member to the track.

17. The method of claim 15 wherein said locating the floating joint includes connecting the floating joint to the first member.

18. The method of claim 17 wherein said locating the floating joint also includes connecting the floating joint to the seat assembly.

19. The method of claim 15 wherein said locating the floating joint includes locating the floating joint at the second point engageable with the second member.

20. The method of claim 19 wherein said providing a mounting device includes providing a mounting device including the second member which defines a clearance about the floating joint such that during the compressive force the second member is isolated from the floating joint.

21. The method of claim 20 wherein said providing a mounting device includes providing a mounting device including a floating joint with an enlarged head such that during the pulling force the enlarged head of the floating joint is engaged with the second member.

* * * * *